BERNARD S. BENSON
ROUEL R. CAMPBELL
INVENTORS

BY Warren T. Jessup
ATTORNEY

Nov. 23, 1965         B. S. BENSON ETAL                 3,218,910
              PANORAMIC FILM VIEWER WITH GYROSCOPIC
                    STABILIZING REFERENCE MEANS
Filed April 9, 1962                            3 Sheets-Sheet 2

BERNARD S. BENSON
ROUEL R. CAMPBELL
              INVENTORS

BY
   Warren T. Jessup
              ATTORNEY

BERNARD S. BENSON
ROUEL R. CAMPBELL
INVENTORS

BY Warren T. Jessup
ATTORNEY

United States Patent Office 3,218,910
Patented Nov. 23, 1965

3,218,910
PANORAMIC FILM VIEWER WITH GYROSCOPIC STABILIZING REFERENCE MEANS
Bernard S. Benson, Malibu, and Rouel R. Campbell, Canoga Park, Calif., assignors, by mesne assignments, to Bank of America National Trust and Savings Association
Filed Apr. 9, 1962, Ser. No. 186,049
3 Claims. (Cl. 88—1)

This invention relates to panoramic film viewers, by means of which a person may progressively or successively view a sweeping panorama scene.

It is an object of this invention to provide a viewer which, when used by a person to observe a panoramic scene, produces a high degree of realism in simulating an actual appearance on the spot where the panoramic picture was taken. The viewer thus enables a person to project himself with maximum realism into the actual scene represented by the picture.

It is another object of this invention to provide a panoramic film viewer which is economical to manufacture, light in weight, and easy to use.

It is a further object of this invention to provide a panoramic film viewer which will accept conventional film strips taken with a panoramic camera.

It is a further object of this invention to provide a film viewer in which panoramic film strips to be viewed may be quickly and easily inserted and removed.

In accordance with the present invention means are provided for supporting a panoramic film or picture in a casing or housing. A fixed or stabilized reference is coupled to the film strip or picture, so that as the user turns his body along with the viewer, the film automatically and progressively moves past the field of view at exactly the same angular rate as the user rotates. This creates a high degree of realism in simulating the movements of a person were he actually on the scene where the picture was taken. For example, as the person views the scene and swings to the right, there is brought into view that portion of the actual scene which lies to the right. Similarly if he swings to the left there is brought into his field of view that portion of the panoramic scene lying to the left. This phenomenon occurs progressively as the user rotates the housing and himself as well. Thus while viewing the scene the user may turn completely around through 180° and there will be successively brought before his field of view the scene as it would appear were he actually at the spot where the picture was taken, until finally he sees exactly what was behind him. He may continue on around and around, or may swing back and forth as he might do were he present on the site where the picture was taken.

In accordance with the foregoing objects and brief description, specific forms of the invention will now be described with reference to the accompanying drawings, wherein.

Figure 1:
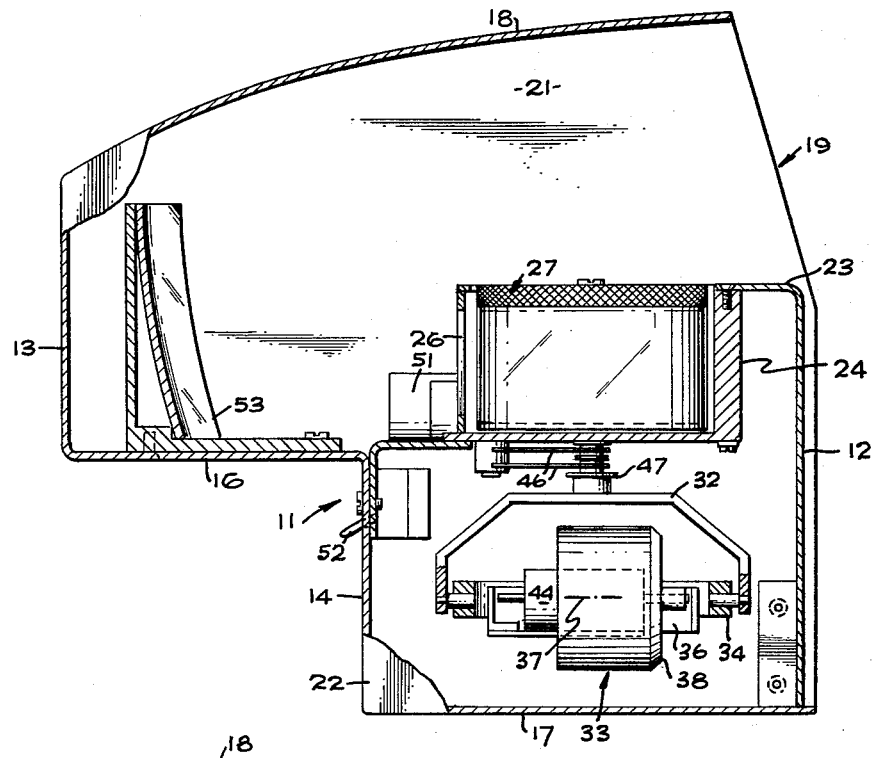
FIGS. 1 through 4 are views of a first form of the present invention, FIG. 1 being an elevational section, FIG. 2 being another elevational section taken at right angles to FIG. 1, FIG. 3 being a plan section taken on line 3—3 in FIG. 2, and FIG. 4 being an exploded detail showing certain portions of the film cartridge which is scanned in the film viewer.

Referring to FIGS. 1-4, 11 represents a housing having a front wall 12; a back wall consisting of offset walls 13 and 14 joined by a shelf 16; a bottom 17; and an arched top 18. Between the front edge of the top 18 and the upper edge of the front wall 12, is a viewing opening 19, through which a person looks in order to observe the picture to be presented in panorama fashion. The housing is completed by side walls 21 and 22.

Figure 2:
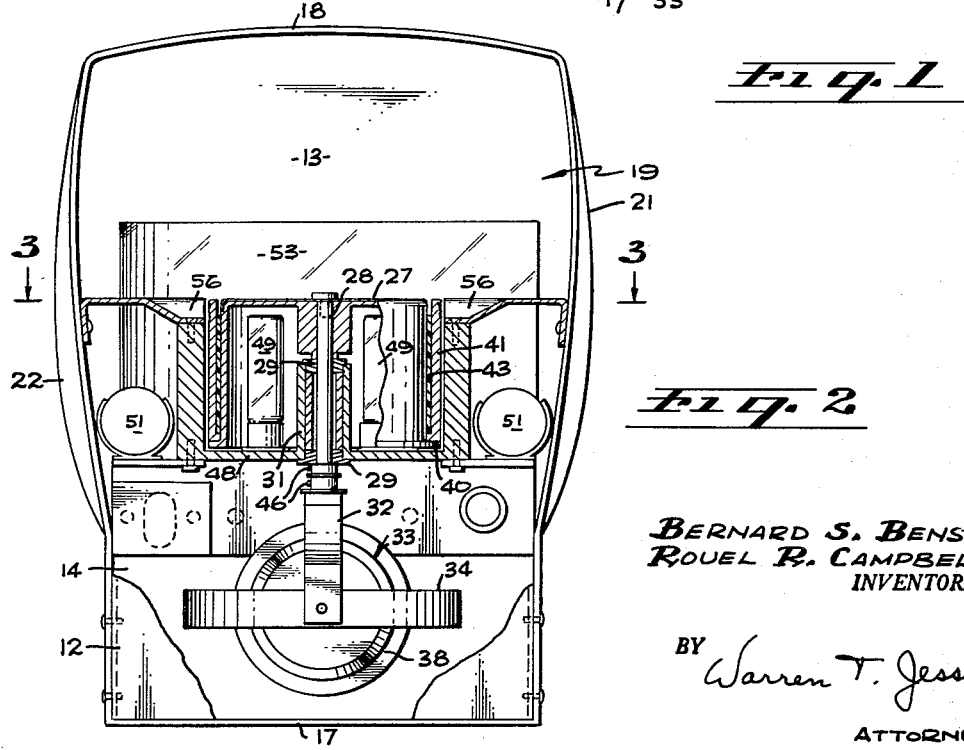
Figure 3:
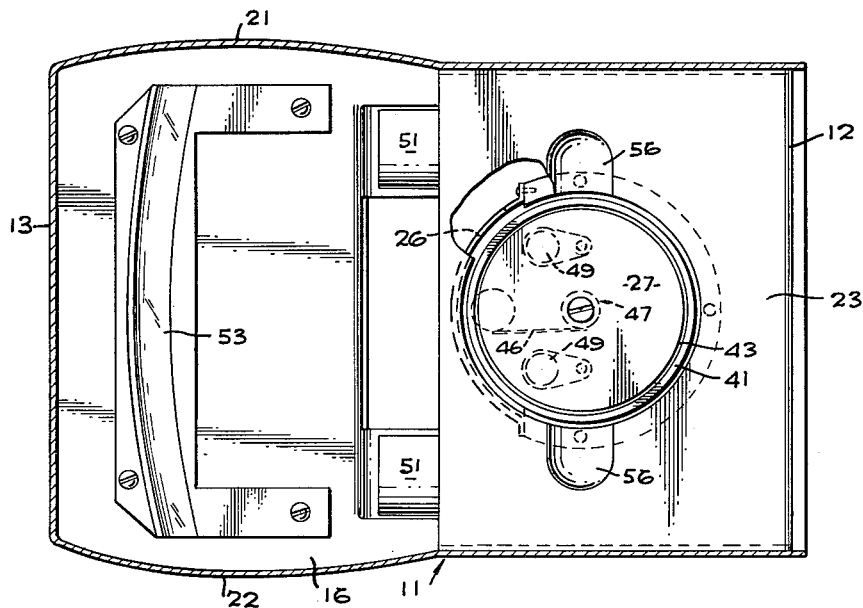

In the fore part of the housing 11, an interior shelf 23 is formed at the upper edge of the front wall 12, and beneath this shelf is located a generally cylindrical framework 24 having an arcuate window 26 giving access to a cylindrical film holder or hub 27. As best seen in FIG. 2, the hub 27 is secured to a shaft 28 journaled in bearings 29 formed on an upstanding boss 31 constituting a portion of the framework 24.

Fixed to the lower end of the shaft 28 is a yoke 32, forming an outer gimbal for a free gyroscope 33. As shown in FIGS. 1 and 2 the shaft 28, and hence the rotative axis of the yoke 32, is generally vertical, and as a rule is held vertical by the user when the viewer is used.

Spanning the yoke 32 and journaled therein on a horizontal axis is an intermediate gimbal 34, and within the intermediate gimbal 34 is an inner gimbal 36 which is pivotally mounted to the gimbal 34 on a horizontal axis 37, transverse to the axis of the gimbal 34. A gyroscopic mass 38 is pivotally mounted to spin gyroscopically in the gimbal 36, on an axis transverse to 37. In use, it will be readily understood that the gyroscope 33, when the mass 38 is spinning, causes the shaft 28 to resist turning. Thus as the housing 11 is rotated or swung around in an arc, the shaft 28 resists turning, and in effect forms a stabilized or fixed reference, which maintains azimuth orientation of the film holder 27 irrespective of the rotation of the housing 11.

Figure 4:
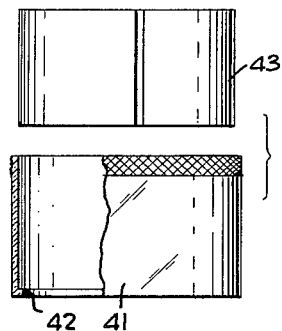

The cylindrical walls of the hub 27 are translucent but not transparent so as to diffuse light therethrough. Over the hub 27 is dropped a transparent cylindrical cartridge 41, which rests on an outwardly extending ledge 40 formed at the bottom of the hub 27. The cartridge 41 has an inner annular ledge 42 on which rests the bottom edge of a film strip 43. The strip 43 represents any panoramic 360° scene and is a transparency through which light may pass. It is normally flat and when curved into a cylindrical configuration, as shown in FIG. 4, and placed inside the cylinder 41, its natural resiliency causes it to bear outwardly into engagement with the transparent cylindrical wall 41.

An electric motor 44 is provided in the gyroscope 33 for rotating the gyroscopic mass 38 at high speed. Power is brought to the motor through brushes 46 bearing against slip rings 47 on the shaft 28.

Mounted within the hub 27, but fixed to the floor 48 forming a part of the interior frame work 24, are a pair of light bulbs 49, which serve to illuminate the film 43 from within. Power is supplied to these bulbs 49 from a pair of batteries 51, which also supply power to the gyroscope motor 44, through an externally operable switch 52.

An optical system carries the scene on the film 43 through the transparent cartridge 41, arcuate opening 26, to a concave reflecting mirror 53, and thence to the window 19 through which the person using this apparatus looks.

To use the viewer, a person turns on the switch 52, which energizes the lights 49 and starts the gyroscopic mass 38 spinning. As soon as the gyroscope is up to speed, the person looks through the window 19 and sees the transparency 43 illuminated by the lights 49. With the housing 11 still held to his eyes, the user may swing to the right. This will cause the housing 11 to rotate, but the gyroscope will stabilize the hub or cylinder 27 and the film holding cartridge 41 mounted thereon. The result will be to cause relative rotation between the film 43 and the housing 11 about the axis 28. Hence there will be brought progressively into the user's field of view, a different portion of the panoramic picture 43. The angular movement of the housing 11 will correspond exactly to the angular change of scene viewed by the user. Thus maximum realism is achieved as the housing is rotated through as many degrees or as often as desired.

New scenes may be inserted simply by lifting the cartridge 41 off the hub 27, and for this purpose finger recesses 56 indented into the floor or shelf 23 are provided for external grasping of the cartridge 41. When the cartridge 41 is removed, the film 43 may be taken out and another film inserted in place. The cartridge 41 is then dropped into place over the cylinder 27 and comes to rest on the outwardly projecting ledge 40 at bottom of the hub 27.

Figure 5:
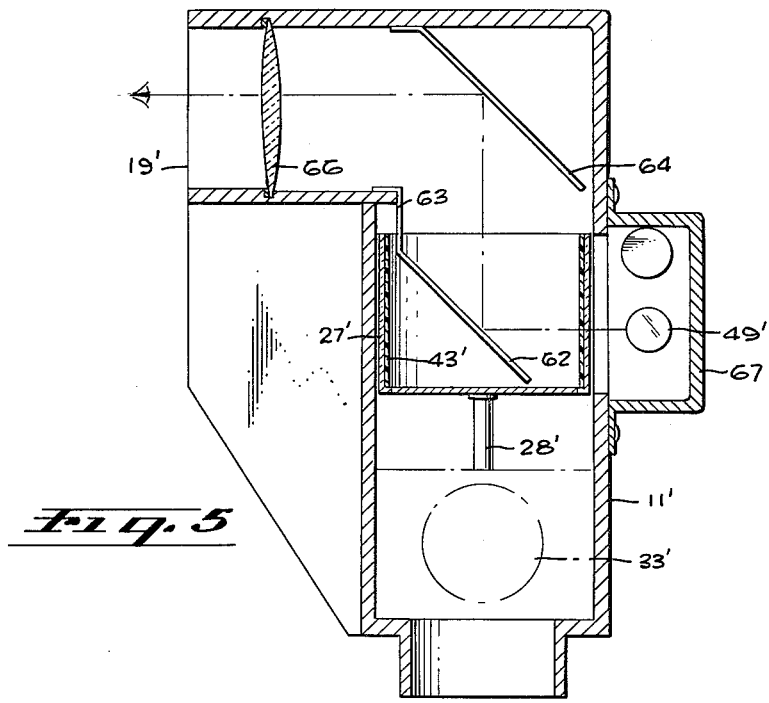
FIG. 5 illustrates another form of the present invention.

In FIG. 5 another form of the invention is shown wherein the illumination of the transparency 43 is from outside to inside and the viewing is from inside to outside. In this figure the housing or casing 11' serves to support a gyroscope 33' whose shaft 28' supports a translucent cylinder or hub 27'. In the FIG. 5 modification the hub 27' also serves as the cartridge for receiving on its interior face the film strip 43'.

The cylinder 27' is translucent although not transparent, so as to diffuse the light from the source 49' evenly over that portion of the film 43' which is within optical view of the mirror 62.

Within the cylinder 27' is disposed an oblique reflecting mirror 62 fixed to the housing 11' by a bracket 63. A second reflecting mirror 64 serves to transmit the image of the film 43' to a lens system represented schematically at 66 and thence to the viewing window 19'. A projecting cupola 67 on the housing 11' houses a light bulb 49', which illuminates the film 43' from the outside.

In use the illuminated film 43' is viewed through the window 19' by means of the optical system consisting of the lens 66 and mirrors 64 and 62. As in the case of the embodiment shown in FIGS. 1–4 as the user holds the housing 11' with his eyes to the viewing window 19' and rotates or turns his body around from side to side, the gyroscope 33' stabilizes the shaft 28' and causes rotation between the film cartridge 27' and the housing 11', about the axis 28'. The effect is the same as in the earlier described form, and the user derives a very realistic sense of being actually on the scene of the panoramic film 43'.

Figure 6:
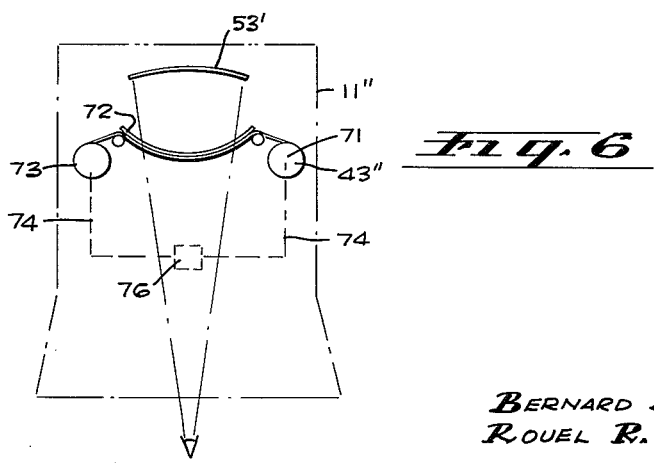
FIG. 6 represents still another form of the present invention.

In FIG. 6 there is shown schematically still another form of the present invention wherein a series of panoramic views 43'' are arranged serially on a single film strip. This series of film strips is then reeled onto a reel 71, past a viewing frame 72, and then onto a second reel 73. The reels 71 and 73 are coupled synchronously, as shown at 74, to a gyroscopic stabilizing mechanism shown at 76. As the housing 11'' is rotated, the output shaft of the gyroscope 76 remains fixed thus causing relative rotation between the gyroscope output shaft and the housing 77. By virtue of the coupling 74 the reels 73 and 71 turn, one unwinding while the other winds, and progressively pulls the panoramic film strip 43'' past the viewing area 72 at exactly the same angular rate as the housing 77 is turned.

The modification shown in FIG. 6 has the advantage that by continuously turning in the same direction the viewer displays successively one panoramic scene after the other. Thus after completely viewing one film, continued rotation in the same direction, instead of repeating the scene, as in the previous embodiments, will cause a new scene to be drawn into the field of view.

As in the case of the previous modifications a suitable optical system, represented schematically by the reflecting mirror 53' is provided.

Instead of transporting the film strip between reels 71 and 73, the strip could be in the form of an endless belt in which the scenes would repeat themselves.

It will be readily appreciated that if the friction load on the gyroscope is too great, there will not be complete synchronism between the turning of the housing 11 and the relative rotation effected through the shaft 28. This may be offset in large measure by coupling the gyro to drive a servo system. With its greater power output, the servo will tend to minimize the differential or lag between the turning of the housing and the turning of the shaft 28. Such a system is particularly efficacious in the modification shown in FIG. 6 where a considerable friction load is involved in drawing the film strip 43'' from one reel 73 to the other reel 71 and back.

The gyroscope 33 is but representative of a broad class of inertial devices, any one of which could serve to effectuate its function in this environment. For example, the entire gyroscope 32, including the yoke 32 and all of the internal gimbals and mass 38 may be replaced by a heavy ring or weight secured directly to the shaft 28. Such an inertia, with good bearings 29 tends to stabilize the film carrying cylinder 41, so that as the housing 11 is rotated the film would tend to remain stationary and allow panoramic sweep of the film 43 past the viewing area of the optical system. Such an inertial system may be readily amplified by employing the inertia secured to the shaft 28 in the matter of an accelerometer, which closes electric contacts to energize a servo system that drives the shaft 28 in a direction to open the contacts. Such accelerometer techniques are well known in the art and may be employed as desired.

In place of the gyroscope, a type of stabilizing represented by a vibrating and weighted reed may be substituted. The equivalence between gyroscopes and vibrating reeds is well known in the art and the substitution would be obvious to one skilled in the art.

It will be readily appreciated that the concepts of the present invention are not limited to direct viewing but may be readily incorporated into a projecting optical system wherein the image on the film 43 is projected onto a screen and then viewed by the viewer. Such an apparatus could be mounted to the back of a swivel chair and project onto a screen also mounted on the chair and in the range of view of a person seated in the chair. As the user swivels the chair around, the panoramic picture is automatically and progressively changed in realistic fashion before the view of the user as he observes the image appearing on the screen.

While the instant invention has been shown and described herein in what is conceived to be the most practical and preferred embodiments, it is recognized that departures may be made therefrom within the scope of the invention which is therefore not to be limited to the details disclosed herein, but is to be afforded the full scope of the following claims.

What is claimed is:

1. A viewer for a panoramic picture comprising a housing, a vertical shaft rotatably mounted within said housing, a cylindrical hub mounted on said shaft, said hub being adapted to receive said panoramic picture on the periphery of said hub, said housing including a viewing aperture, an optical system including an illumination source for viewing a segment of said panoramic picture through said viewing aperture, and inertial means mounted on said vertical shaft for restraining rotation of said shaft and hub as said housing is rotated on a vertical axis so that the person viewing the picture may progressively view segments of the entire panorama, said inertial means comprising a gimbal affixed to said vertical shaft and a gyroscope carried within said gimbal.

2. A viewer in accordance with claim 1 in which said gyroscope is provided with an electrically driven motor and in which said viewer is provided with a battery for energizing said electric motor and said illumination source.

3. A viewer for a panoramic picture comprising a housing, a vertical shaft rotatably mounted within said housing, a cylindrical hub mounted on said shaft, said hub being adapted too receive said panramic picture on the periphery of said hub, said housing including a viewing aperture, an optical system including an illumination source for viewing a segment of said panoramic picture through said viewing aperture, and inertial means mounted on said vertical shaft for restraining rotation of said shaft and hub as said housing is rotated on a vertical axis so that the person viewing the picture may progressively view segments of the entire panorama, said inertial means comprising a yoke of generally U-shaped configuration, the center portion of which is affixed to said vertical shaft, an intermediate gimbal spanning said loke and journalled therein, an inner gimbal pivotally mounted within said intermediate gimbal, and a gyroscopic mass rotatably mounted within said inner gimbal.

References Cited by the Examiner

UNITED STATES PATENTS

| | | |
|---|---|---|
| 705,771 | 7/1902 | Lumiere. |
| 888,236 | 5/1908 | Hattu. |
| 2,372,091 | 3/1945 | Land _____ 88—1 |
| 2,515,200 | 7/1950 | Draper. |

JEWELL H. PEDERSEN, *Primary Examiner.*